Patented Nov. 26, 1946

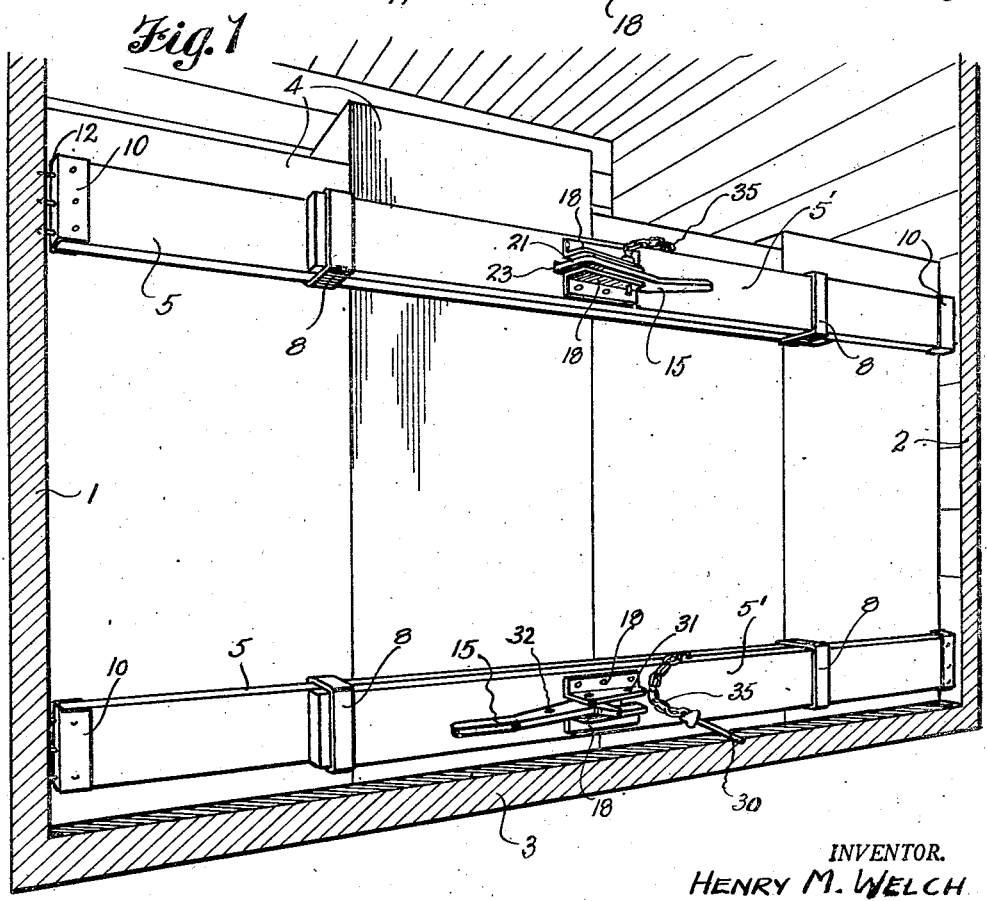

2,411,768

UNITED STATES PATENT OFFICE 2,411,768

BOXCAR BRACE

Henry M. Welch, Seattle, Wash.

Application September 2, 1944, Serial No. 552,477

4 Claims. (Cl. 105—369)

This invention relates to improvements in freight and cargo bracing devices and it has reference more particularly to braces designed to be used in such vehicles of transportation as box cars, trucks and trailers, as braces for stacked boxes, or other articles of freight, and which are likewise usable in freight storage depots, warehouses and the like; it being the principal object of this invention to provide a brace that is adjustable in length; that may be readily and easily adjusted and applied across a car or truck as a supporting brace for cargo, freight or stacked articles, and which has means at its ends adapted to be pressed into holding contact with the car walls by forcibly extending the length of the brace.

More specifically stated, the invention resides in the provision of a brace of the character above stated, comprising two complemental brace beams or planks of a designated length, arranged in face to face contact, and adjustable endwise relative to each other to adapt it to the width of car or truck in which it is used and also as a means of increasing the effective length to effect its functional securement; the two planks or sections being held functionally together for endwise adjustment by guide bands applied thereto, and each plank being equipped at its outer end with spikes that may be pressed into the side walls of a car by an expanding operation, and may likewise be withdrawn to release the brace by a retracting operation.

Another object of the invention is to provide a hand lever mechanism of novel character for the quick, easy and effective expanding and retracting of the complemental sections of the brace.

Still further objects of the invention reside in the details of construction of the various parts, in their relationship and mode of operation, as will hereinafter be fully described.

In accomplishing these and other objects of the invention, I have provided the improved details of construction, the preferred forms of which are illustrated in the accompanying drawing, wherein—

Fig. 1 is a perspective view illustrating the application and use of braces embodied by the present invention for the support of articles in a box car.

Fig. 2 is an edge view of one of the braces, shown partly in section for better understanding and illustration.

Fig. 3 is a perspective view of the hand lever mechanism for expanding the length of the brace to secure it in place.

Referring more in detail to the drawing—

In Fig. 1, I have shown braces embodied by this invention, as applied horizontally across what may be a box car for the support of boxes or other articles of freight. In this view, opposite side walls of the car are designated, respectively, by reference numerals 1 and 2, and the floor of the car is designated by numeral 3. It is to be understood that the side walls, at least, are lined interiorly with wood or other material into which the spikes, at opposite ends of a brace, may be pressed, as presently explained, to secure the brace functionally in place. The supported articles of freight or cargo herein shown are designated by reference character 4.

Each brace comprises two complemental plank-like sections 5 and 5', here shown as being substantially the same length and this length is somewhat less than the distance between the car walls or distance to be spanned by the brace. For purpose of easier explanation, the plank 5 will be referred to as the inner section or member of the brace since it is placed adjacent the articles to be supported, and the plank 5' will be referred to as the outer section or member since it is at the outside of the applied brace.

The two sections are placed face to face in overlapped relationship, with one end of each extended beyond the corresponding end of the other. The two sections are adjustably held together for endwise adjustment, by metal straps or loops 8 that are applied thereabout, and it is preferred that these loops be fixed to one section and that the other shall slide freely therethrough, and it is most practical that the extending end portions of the sections shall be slidable in the loops.

Each section of the brace is equipped at its extended end with a protective plate or strap 10 applied thereabout, and fixed in these plates are spikes 12, projecting approximately three-fourths of an inch beyond the plate. When the brace is to be put into use, it may be disposed across the car and the two planks or sections thereof adjusted endwise relative to each other to cause the spikes at their ends to engage the wooden walls, then by means, now to be described, the brace will be extended or expanded endwise in a manner whereby to cause the spikes to be pressed into the walls thus to secure the brace in place.

The means herein provided for expanding or increasing the length of the brace comprises a hand lever 15 that is pivotally mounted on the outer section of the brace between the flanges of two spaced angle iron members 18—18 that are fixed by screws or bolts, as at 19, to the outer section 5'. The lever is pivotally mounted by a pivot pin 20 to swing in a horizontal plane between the positions in which the levers of upper and lower braces have been shown in Fig. 1. At its inner end, closely adjacent the pivot, the lever 15 has a short, laterally directed lever arm 21 that is adapted to swing through a longitudinal slot 23 in the section 5' to cause the end portion thereof to be engaged within any of a series or succession of holes or notches 25 in a metal plate 26 that is countersunk in the other face or the inner section 5, as seen in Figs. 2 and 3. This plate extends lengthwise of the brace, and the line of holes therein moves in registration with the slot 23 in making the various adjustments of the brace.

In expanding or extending the brace to press the spikes at its ends into the car walls, the lever is first swung to a position at which the short lever arm 21 is entirely clear of the plate 26. Then, after the two sections 5 and 5' have been adjusted endwise to engage the spike at their ends with the opposite side walls of the car, the lever is swung on its pivot in a direction to cause the pointed end of lever arm 21 to engage in one of the holes 25. Then by pressing the lever toward its final limit of travel; that is, to the position of the lever of the upper brace in Fig. 1, the two brace sections 5 and 5' will be moved endwise relative to each other and the spikes at their ends pressed into the walls to hold the brace in position.

Provision is made for locking the lever to retain the sections 5 and 5' in the extended position. This comprises a pin 30 that may be applied through holes 31 in the flanges of the angle members 18—18 and a registering hole 32 in the lever arm. Fig. 1 shows these pins as being affixed to short lengths of chain 35 which are fixed to the brace to prevent loss of the pin when pulled out.

To release a brace, it is only necessary to draw the locking pin 30 and swing the lever arm outwardly from the locked position. This retracts the sections to disengage the spikes from the car walls and frees the lever from the inner section and permits the brace to be retracted in length.

Such braces may be made of various materials and in sizes required for use in any specific place or places, and by their use, a great saving in time, materials and labor is effected. Preferably plywood would be used for the sections, but I do not wish to be confined to any specific material or materials for the parts used in the construction.

While I have herein shown the device as comprising the two plank-like sections 5 and 5' as being of wood and slidable one upon the other, it is anticipated also that tubular sections of pipe-like form, round or rectangular in cross section, might be telescopically arranged for similar use, and equipped with spike equipped ends and a similar lever mechanism for expanding or contracting the brace.

Having thus described my invention, what I claim as new therein and desire to secure by Letters Patent is:

1. In a brace of that kind including two telescopically associated brace sections, adapted for relative endwise adjustment to extend or shorten the overall length of the brace and wherein each section has one end thereof extended beyond the adjacent end of the other and equipped at that end with spikes adapted to be pressed into holding contact with a wall; a securing and releasing means comprising a lever pivotally mounted near its end on one of said sections and a rack plate fixed on the other section to be engaged by the lever end in use of the lever as a pry for the forcible extension and forcible withdrawal of the spikes from a wall and contraction of the brace.

2. In a brace of that kind including two plank-like sections, assembled face to face, each with one end extended beyond the corresponding end of the other, and equipped at that end with projecting spikes adapted to be pressed into holding contact with a wall surface and guide bands applied about the sections and fixed to one of them to retain the sections slidably assembled for relative endwise adjustment; a securing and releasing means comprising a plate fixed to the outer face of the inner section lengthwise thereof and formed with a longitudinal row of apertures, said outer section having an opening therethrough registering with the said plate, a lever pivotally mounted on the outer section for swinging movement in the longitudinal plane of the brace and having a short lever arm at its pivoted end adapted to pass through the opening of the outer section to be selectively engaged in the plate apertures for the forcible extension or retraction of the brace.

3. In a brace of that kind including two plank-like sections, assembled face to face for telescopic adjustment, each with one end extended beyond the corresponding end of the other, and equipped at that end with projecting spikes adapted to be pressed into holding contact with a wall surface, a securing and releasing means comprising a plate fixed in the outer face of the inner section of the brace, longitudinally thereof, and formed at spaced intervals therealong with apertures, said outer section having an opening therethrough registered with said plate, a pair of parallel, spaced angle bars fixed to the outer section of the brace lengthwise thereof, at opposite sides of said opening, a lever pivoted at one end between the flanges of the angle bars, and equipped at its pivoted end with a short lever arm to be selectively engaged with the apertures of the plate to force the extension or retraction of the brace.

4. In a brace of that kind including two plank-like sections, assembled face to face for telescopic adjustment, each with one end extended beyond the corresponding end of the other, equipped at that end with projecting spikes adapted to be pressed into holding contact with a wall surface, a securing and releasing means comprising a plate fixed in the outer face of the inner section of the brace, longitudinally thereof, and formed at spaced intervals therealong with apertures, said outer section having an opening therethrough registered with said plate, a pair of parallel, spaced angle bars fixed to the outer section of the brace lengthwise thereof at opposite sides of said opening, a lever pivoted at one end between the flanges of the angle bars, and equipped at its pivoted end with a short lever arm to be selectively engaged with the apertures of the plate to force the extension or retraction of the brace, and said angle bars having holes therethrough and said lever having a hole therethrough to register with the holes of the angle bars to receive a locking pin to hold the brace sections at a set adjustment.

HENRY M. WELCH.